United States Patent
Rhoades et al.

(10) Patent No.: US 9,559,925 B2
(45) Date of Patent: *Jan. 31, 2017

(54) NETWORK SWITCH LOAD BALANCE OPTIMIZATION

(71) Applicant: LENOVO ENTERPRISE SOLUTIONS (SINGAPORE) PTE. LTD., New Tech Park (SG)

(72) Inventors: David B. Rhoades, Raleigh, NC (US); Tomasz F. Wilk, Longwood, FL (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,102

(22) Filed: Jun. 9, 2015

(65) Prior Publication Data

US 2015/0271040 A1    Sep. 24, 2015

Related U.S. Application Data

(63) Continuation of application No. 11/563,780, filed on Nov. 28, 2006, now Pat. No. 9,054,964.

(51) Int. Cl.
*H04L 12/26* (2006.01)
*H04L 12/24* (2006.01)
*H04L 12/911* (2013.01)

(52) U.S. Cl.
CPC ....... *H04L 43/0823* (2013.01); *H04L 41/0816* (2013.01); *H04L 47/726* (2013.01)

(58) Field of Classification Search
USPC .. 709/224, 225; 370/312; 380/282; 714/763, 47.1
See application file for complete search history.

(56) References Cited

U.S. PATENT DOCUMENTS

| 7,222,062 B2 * | 5/2007 | Goud | G06F 21/57 380/282 |
|---|---|---|---|
| 2003/0144816 A1 * | 7/2003 | Sokac | G05B 9/02 702/179 |
| 2003/0233611 A1 * | 12/2003 | Humlicek | G06F 11/1092 714/763 |
| 2004/0078686 A1 * | 4/2004 | Toyooka | G06F 11/0715 714/47.1 |
| 2004/0103187 A1 * | 5/2004 | Jacob | H04L 12/2602 709/224 |

(Continued)

*Primary Examiner* — Tammy Nguyen
(74) *Attorney, Agent, or Firm* — Steven M. Greenberg, Esq.; CRGO Law

(57) ABSTRACT

A network load balancing method in a blade grouping chassis can be provided. The method can include detecting system conditions among blades coupled to a single blade grouping chassis. The method also can include maintaining a rotation of selected ones of the blades among which individual blades are selected for use in network load balancing inbound workloads. Finally, the method can include removing an individual blade from the rotation responsive to detecting a system condition in the individual blade indicative of an inability of the individual blade to support high availability in network load balancing. As such, the method further can include re-adding the individual blade to the rotation responsive to detecting a system condition in the individual blade indicative of an ability of the individual blade to support high availability in network load balancing.

8 Claims, 2 Drawing Sheets

(56) References Cited

U.S. PATENT DOCUMENTS

2004/0162901 A1* 8/2004 Mangipudi ........... H04L 69/329
709/225
2004/0264398 A1* 12/2004 Chu ....................... G01B 11/27
370/312

* cited by examiner

NETWORK SWITCH LOAD BALANCE OPTIMIZATION

CROSS-REFERENCE TO RELATED APPLICATION

This application is a Continuation of U.S. application Ser. No. 11/563,780, filed Nov. 28, 2006, the entirety of which is incorporated herein by reference.

BACKGROUND OF THE INVENTION

Field of the Invention

The present invention relates to the field of network high availability and more particularly to load balance optimization in a network switch.

Description of the Related Art

The data center has changed over time from a mainframe centric environment requiring dozens of skilled technologists to ensure the ongoing operation of the mainframe, to a complex environment of many different server computing platforms coupled to one another over sophisticated data communications networks. Initially a resource only available to the wealthiest of organizations, recent advances in the mass production of personal computers has provided access to data center technologies at a reasonable cost. Generally facilitated by a rack, the modern data center involves the arrangement of a multiplicity of personal computers in one or more racks coupled together according to conventional network protocols.

Access to the data center resource for the average organization is not without its cost. In particular, the arrangement of multiple computing platforms in a rack environment exposes the data center to many points of failure requiring substantial redundancy in hardware resources. Additionally, the sheer energy consumption by a cluster of computing hosts in a data center can become noticeably large. The physical consumption of space in the data center by an arrangement of computers can result in a nearly unmanageable environment. All told, the arrangement of ordinary computers in a rack environment within the data center can be unwieldy and an undesirable management challenge.

Addressing the unwieldy and unreliable nature of rack-mounted ordinary computers, blade server solutions have become pervasive in more sophisticated data centers. In the blade center environment, different computing platforms can be arranged into blades and coupled to one another across a mid-plane in a single chassis. The mid-plane can provide access to a unified power source, input output (I/O) devices and even removable media drives. In this way, the blades need not include or manage a power supply or commonly used drives within the blades themselves resulting in substantial power savings, a reduced footprint and overall lower total cost of ownership. Additionally, failover concerns can be met through the hot-swappable nature of the blades in the chassis.

Blade groupings within a single chassis provide a natural hardware platform for high availability application designs. High availability refers to the load balancing of workloads to ensure an optimal utilization of application resources. Load balancing has proven especially effective in handling request-response styled workloads common in interactions with Web based applications. In the typical software load balancing scenario, inbound workloads are passed into different application instances in a round robin fashion in order to distribute the aggregate load experienced by the load balanced system. More intelligent load balancing designs track the availability of different application server instances in different computing hosts to identify those instances able to support an inbound workload.

Analogously, load balancing has been applied to the network environment in order to select different hardware platforms to process inbound workloads to ensure high availability. As in the case of software load balancing, in network load balancing, workloads can be dispersed in a round robin fashion. Alternatively, it is well known to monitor transport control protocol (TCP)/Internet protocol (IP) traffic and network throughput to determine which hardware platform is to receive in inbound workload. Notably, network load balancing has been implemented in the context of blade groupings in which a centralized workload controller selects blades in the blade grouping to process an inbound workload. When implemented in blade groupings, however, network load balancing remains limited to considering TCP/IP traffic and network throughput when determining how to allocate inbound workloads.

BRIEF SUMMARY OF THE INVENTION

Embodiments of the invention address deficiencies of the art in respect to load balancing and provide a novel and non-obvious method, system and apparatus for network switch load balancing optimization. In one embodiment of the invention, a highly available network data processing system can be provided. The system can include a blade grouping chassis comprising a unified power supply and a switch module configured for network load balancing, and multiple different server blades disposed in the chassis, each of the blades including a service processor and corresponding service processor device driver. Finally, the system can include a management module coupled to the chassis over a communications link.

The management module can include program code enabled to remove a blade from a network load balancing rotation responsive to detecting a system condition in the blade. The system condition can include, for example, intense central processing unit (CPU) utilization in the blade. Alternatively, the system condition can include an executing application known to consume excessive CPU cycles. As yet another alternative, the system condition can include a notification of an impending failure in a hardware component of the blade. For instance, using a predictive failure analysis incorporating self-diagnostics and heuristics, hardware components operating outside of normal specifications can be marked as suspect as can hardware components operating near historical failure thresholds.

In another embodiment of the invention, a network load balancing method in a blade grouping chassis can be provided. The method can include detecting system conditions among blades coupled to a single blade grouping chassis. The method also can include maintaining a rotation of selected ones of the blades among which individual blades are selected for use in network load balancing inbound workloads. Finally, the method can include removing an individual blade from the rotation responsive to detecting a system condition in the individual blade indicative of an inability of the individual blade to support high availability in network load balancing. As such, the method further can include re-adding the individual blade to the rotation responsive to detecting a system condition in the individual blade indicative of an ability of the individual blade to support high availability in network load balancing.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for network switch load balancing optimization. In accordance with an embodiment of the present invention, system level attributes in a blade can be accounted for when developing load balancing determinations. Specifically, one or more rules can be established dictating load balancing decisions for different sensed system level conditions. The sensed system level conditions can range from imminent failure conditions, to intensive CPU utilization in a blade, to the execution of CPU intense consumptive processes such as disk rebuilds. Thereafter, the system level conditions for each blade in a blade grouping can be detected and the rules can be applied to determine network load balancing for inbound workloads.

Figure 1:
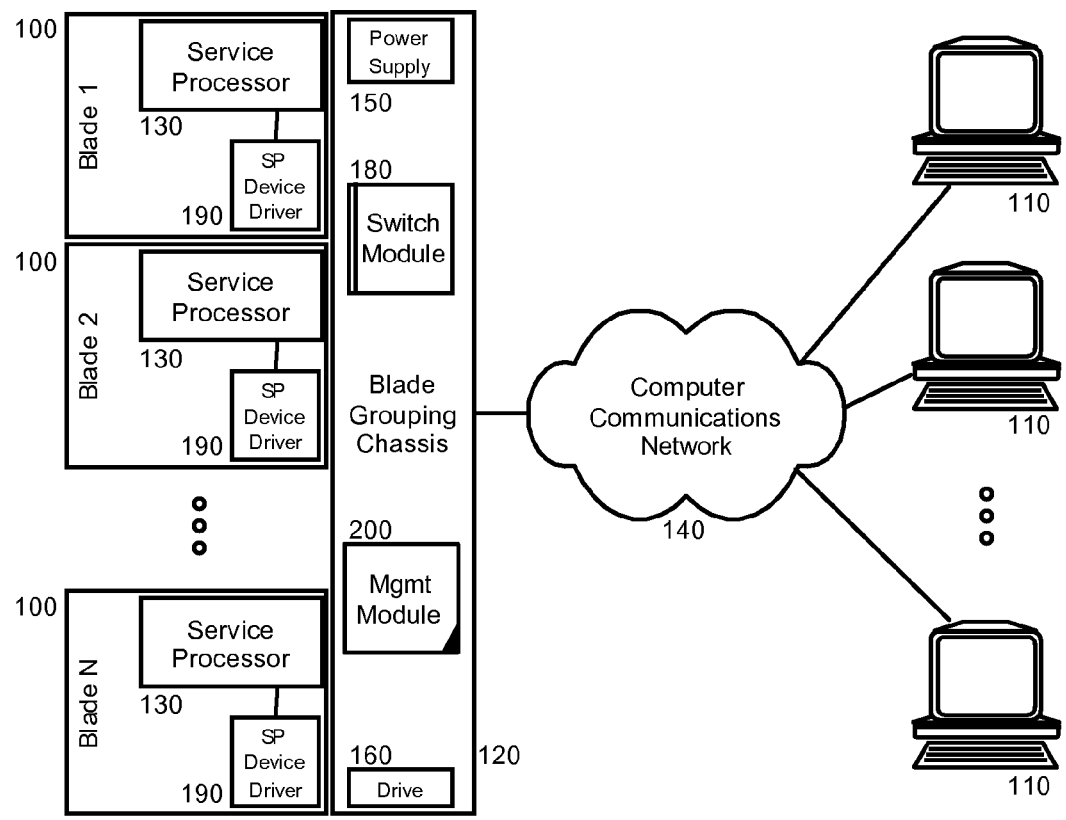
FIG. 1 is a schematic illustration of a network data processing system configured for network switch load balancing optimization; and, FIG. 2 is a flow chart illustrating a process for network switch load balancing optimization.

In illustration, FIG. 1 is a schematic illustration of a network data processing system configured for network switch load balancing optimization. The system can include a blade grouping chassis 120 configured for communicative coupling to one or more client computing systems 110 over a computer communications network 140. The blade grouping chassis 120 can support the interconnection of a multiplicity of server blades 100. Each of the server blades 100 can include a service processor 130 coupled to a service processor device driver 190. The service processor 130 can provide an external interface to a management module 200 in the blade grouping chassis 120 through which logic in the management module 200 can control the blade 100.

The blade grouping chassis 120 can include a common power supply 150 supporting the power requirements for each blade 100 and one or more removable storage drives 160 configured for accessibility by any blade 100. The blade grouping chassis 120 further can include a switch module 180. The switch module 180, for example an Ethernet switch module, can include a configuration for performing network load balancing upon the different blades 100. Finally, the blade grouping chassis 120 can include a management module 200. The management module 200 can include program code enabled control the operation of each blade 100 through the service processor 130 over a communications link such as an interface to core (I2C) bus or an interface to Ethernet. Optionally, multiple different blade grouping chassis can be coupled to the switch module 180 to provide load balancing across multiple blades in multiple different blade grouping chassis.

Notably, through the service processor 130 the management module 200 can monitor system level conditions in each of the blades 100. The system level conditions can include, by way of example, CPU utilization, the execution of a CPU intensive process, or the imminent failure of a hardware component in the blade 100. Responsive to detecting a system level condition, the detected system level condition can be compared to a set of rules defined for the system level conditions. If the detected system level conditions rise to a level indicating that the blade 100 cannot adequately support additionally assigned workloads during network load balancing, the program code of the management module 200 can be enabled to remove the blade 100 from the rotation considered by the switch module 180 during network load balancing. Conversely, responsive to the detection of system level conditions to the contrary, the program code of the management module 200 can be enabled to return the blade 100 to the rotation considered by the switch module 180 during network load balancing.

Figure 2:
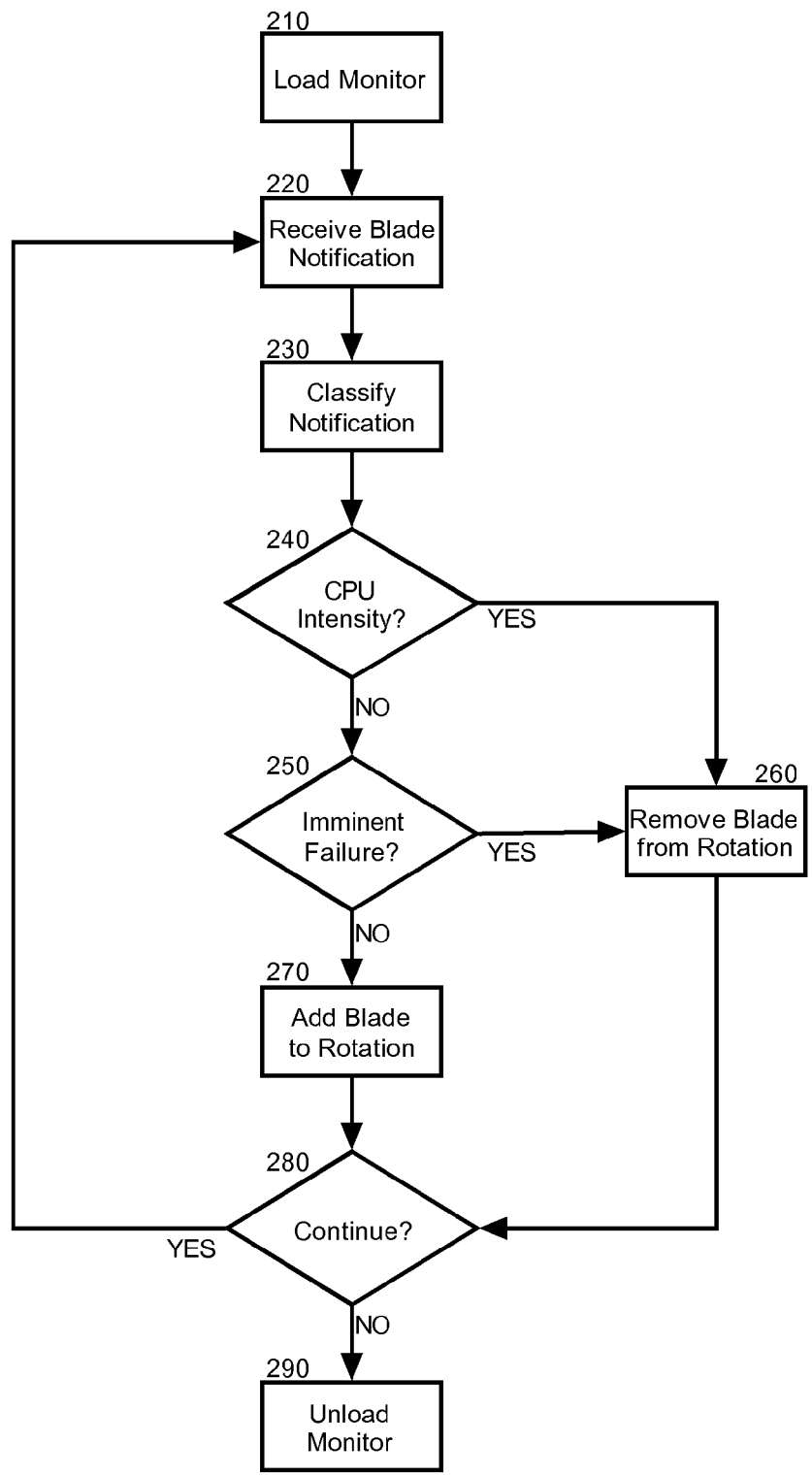

In further illustration of the operation of the management module 200, FIG. 2 is a flow chart illustrating a process for network switch load balancing optimization. Beginning in block 210, a monitor can be loaded for the blades in the chassis. In block 220, a notification can be received a particular one of the blades indicating a change in system conditions for the blade. Thereafter in block 230 the notification can be classified according to the system condition of the blade. For instance, it can be determined whether the system condition pertains to a measurement of the CPU utilization for the blade, an indication of the execution of a CPU intensive application in the blade, or the impending failure of a hardware component of the blade.

In decision block 240, if the system condition indicates that the intensity of CPU utilization has exceeded a threshold level, or if an application has been executed in the blade likely to cause excessive CPU utilization, in block 260 the blade can be removed from the network load balancing rotation for the blade chassis. Alternatively, in decision block 250 if the system condition indicates an impending failure of a hardware component of the blade, again in block 260 the blade can be removed from the network load balancing rotation for the blade chassis. Otherwise, the process can continue through block 270.

In block 270, if neither excessive CPU utilization nor imminent failure is discovered for the blade, the blade will be presumed viable for inclusion in network load balancing. As such, in block 270 the blade can be added to the network load balancing rotation for the blade chassis. Thereafter, in decision block 280 if the process is to continue, the process can repeat through block 220 upon the receipt of a subsequent blade notification. By comparison, in decision block 20 if the process is to end, in block 290 the monitor can be unloaded.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A highly available network data processing system comprising:

a blade grouping chassis comprising a unified power supply and a switch module configured for network load balancing;

a plurality of server blades disposed in the chassis, each of the blades comprising a service processor and corresponding service processor device driver; and, a management module coupled to the chassis over a communications link, the management module comprising program code enabled to detect system conditions among the plurality of server blades, to maintain a rotation of selected ones of the blades among which individual blades are selected for use in network load balancing inbound workloads, and to remove a blade from a network load balancing rotation responsive to detecting a system condition in the blade to support high availability in network load balancing.

2. The system of claim 1, wherein the switch module is an Ethernet switch module.

3. The system of claim 1, wherein the communications link is an interface to core logic (12C) bus.

4. The system of claim 1, wherein the communications link is an interface to Ethernet.

5. The system of claim 1, wherein the system condition comprises intense central processing unit (CPU) utilization in the blade.

6. The system of claim 1, wherein the system condition comprises an executing application known to consume excessive central processing unit (CPU) cycles.

7. The system of claim 1, wherein the system condition is a notification of an impending failure in a hardware component of the blade.

8. The system of claim 1, further comprising an additional blade grouping chassis comprising a plurality of additional server blades, the management module comprising program code further enabled to remove a blade among the additional server blades from a network load balancing rotation responsive to detecting a system condition in the blade.

* * * * *